United States Patent [19]
Yamasaki et al.

[11] Patent Number: 5,888,671
[45] Date of Patent: Mar. 30, 1999

[54] NON-AQUEOUS ELECTROLYTE BATTERY

[75] Inventors: Mikiya Yamasaki; Toshiyuki Nohma; Koji Nishio; Yasuyuki Kusumoto; Yoshihiro Shoji, all of Hirakata, Japan

[73] Assignee: Sanyo Electric Co., Ltd., Moriguchi, Japan

[21] Appl. No.: 835,057

[22] Filed: Apr. 3, 1997

[30] Foreign Application Priority Data

| May 27, 1996 | [JP] | Japan | 8-156243 |
| May 27, 1996 | [JP] | Japan | 8-156244 |
| May 27, 1996 | [JP] | Japan | 8-156245 |

[51] Int. Cl.$^6$ ............................................. H01M 4/62
[52] U.S. Cl. .................................... 429/232; 429/218
[58] Field of Search ................................ 429/218, 232

[56] References Cited

U.S. PATENT DOCUMENTS

| 5,401,598 | 3/1995 | Miyabayashi et al. | 429/218 |
| 5,474,861 | 12/1995 | Bito et al. | 429/194 |
| 5,482,797 | 1/1996 | Yamada et al. | 429/232 X |
| 5,629,109 | 5/1997 | Ito et al. | 429/218 |
| 5,702,845 | 12/1997 | Kawakami et al. | 429/218 X |

FOREIGN PATENT DOCUMENTS

| 0 346 088 | 12/1989 | European Pat. Off. . |
| 0 495 613 A2 | 7/1992 | European Pat. Off. . |
| 0 517 070 A1 | 12/1992 | European Pat. Off. . |
| 0 520 667 A1 | 12/1992 | European Pat. Off. . |
| 0 549 802 A1 | 7/1993 | European Pat. Off. . |
| 04126373 | 4/1992 | Japan . |
| 6-84515 | 3/1994 | Japan . |
| 6-215761 | 8/1994 | Japan . |
| 6-302315 | 10/1994 | Japan . |
| WO 90/13924 | 11/1990 | WIPO . |

OTHER PUBLICATIONS

3·4 Multi–phase Graphitization Phenomenon (Date unknown).
Kuribayashi I. et al., "Battery Characteristics With Various Carbonaceous Materials", Journal of Power Sources, vol. 54, No. 1, 1 Mar. 1995, pp. 1–5.

Primary Examiner—Stephen Kalafut
Attorney, Agent, or Firm—Armstrong, Westerman, Hattori, McLeland & Naughton

[57] ABSTRACT

The present invention is directed to a non-aqueous electrolyte battery comprising an anode, a cathode using a carbon material, and a non-aqueous electrolytic solution, wherein the carbon material obtained by coating a core composed of graphitized carbon in which spacing ($d_{002}$) of lattice planes (002) is in the range of 3.35 to 3.39 Å and the length (Lc) of a crystallite in the direction of the c axis is not less than 1000 Å with coating graphitized carbon in which spacing ($d_{002}$) of lattice planes (002) is more than that in the graphitizing carbon and is in the range of 3.36 to 3.48 Å, the carbon material obtained by coating a core composed of graphitized carbon in which spacing ($d_{002}$) of lattice planes (002) is in the range of 3.35 to 3.39 Å with a calcined product of an organic substance composed of carbon containing sulfur atoms, or the carbon material composed multi-phase graphitized carbon having two or more crystals respectively different crystallinities in one particle, the length (Lc) of a crystallite in the direction of the c axis in each of the crystals being not less than 10 Å, are used for the cathode.

13 Claims, 6 Drawing Sheets

NON-AQUEOUS ELECTROLYTE BATTERY

BACKGROUND OF THE INVENTION

1. Field of the Invention

The present invention relates generally to a non-aqueous electrolyte battery comprising an anode, a cathode using a carbon material, and a non-aqueous electrolytic solution, and more particularly, to a non-aqueous electrolyte battery whose preservation characteristics and cycle characteristics are improved upon improvement of the cathode using the carbon material.

2. Description of the Prior Art

In recent years, as one of new-type batteries having high power and high energy density, a high electromotive-force non-aqueous electrolyte battery using a non-aqueous electrolytic solution as an electrolyte and utilizing oxidation and reduction of lithium has been utilized.

In such a non-aqueous electrolyte battery, a carbon material capable of occluding and discharging lithium ions has been conventionally and widely utilized as its cathode material.

In the case of the non-aqueous electrolyte battery using the carbon material for the cathode, lithium contained in the carbon material used for the cathode reacts with a solvent or the like in the non-aqueous electrolytic solution at the time of preservation, so that self-discharge is induced, and the non-aqueous electrolytic solution is decomposed. As a result, the battery capacity is gradually decreased, and the cycle characteristics are degraded.

As the carbon material used for the cathode as described above, carbon which is not graphitized and graphitized carbon have been conventionally generally used.

When a carbon material having low crystallinity such as carbon which is not graphitized is used, a discharge capacity per unit weight is small, whereby a battery having a sufficient discharge capacity is not obtained. Further, potential at the cathode is gradually increased as discharge is induced, whereby the voltage of the battery is reduced, so as to not obtain a stable voltage. On the other hand, when a carbon material having high crystallinity such as graphitized carbon is used, the discharge capacity per unit weight is increased. However, the potential at the cathode is gradually increased at the end of discharge, whereby the non-aqueous electrolytic solution is decomposed upon reaction on the surface of the carbon material used for the cathode, resulting in degraded cycle characteristics.

In the prior art, a non-aqueous electrolyte battery whose cycle characteristics are improved by adding a non-fluorine polymer mainly composed of butadiene and a fluorine polymer as binders to graphite powder, to hold binding power in a depolarizing mix for the cell as well as to increase binding properties to a copper foil which is a collector, has been proposed, as disclosed in Japanese Patent Laid-Open No. 215761/1994.

Even when the non-fluorine polymer mainly composed of butadiene and the fluorine polymer are thus used as binders, however, a non-aqueous electrolytic solution is still decomposed upon reaction on the surface of graphite, so that the cycle characteristics cannot be sufficiently improved.

Furthermore, in the prior art, an aqueous electrolyte battery whose cycle characteristics and preservation characteristics are improved by mixing a whisker such as a silicon carbide whisker, a silicon nitride whisker, or a potassium titanate whisker with powder of an active material such as a carbon material, as disclosed in Japanese Patent Laid-Open No. 302315/1994, and an aqueous electrolyte battery whose collection efficiency is improved using a carbon material obtained by mixing graphite and coke for a cathode, as disclosed in Japanese Patent Laid-Open No. 84515/1994, for example, have been also developed.

Also in each of the aqueous electrolyte batteries disclosed in the gazettes, it is impossible to sufficiently prevent self-discharge from being induced upon reaction of lithium in the carbon material used for the cathode with a solvent or the like in the non-aqueous electrolytic solution as described above and sufficiently prevent the non-aqueous electrolytic solution from being decomposed, whereby the battery capacity is still reduced at the time of preservation, and the cycle characteristics are still degraded.

SUMMARY OF THE INVENTION

A first object of the present invention is to provide, a non-aqueous electrolyte battery comprising an anode, a cathode using a carbon material, and a non-aqueous electrolytic solution, where the non-aqueous electrolyte battery has good preservation characteristics by having which lithium in the carbon material used for the cathode hardly react with a solvent or the like in the non-aqueous electrolytic solution so as to induce self-discharge at the time of preservation.

A second object of the present invention is to provide, a non-aqueous electrolyte lithium battery which is superior in cycle characteristics, and has a sufficient discharge capacity, and causes a stable battery voltage to be obtained by preventing the non-aqueous electrolytic solution from being decomposed upon reaction on the surface of the carbon material due to a rapid increase in a potential at the cathode using the carbon material at the end of the discharge.

In a non-aqueous electrolyte battery comprising an anode, a cathode using a carbon material, and a non-aqueous electrolytic solution, a first non-aqueous electrolyte battery according to the present invention is characterized in that the carbon material is composed of a core and a surface layer, the core is coated with the surface layer, the core is composed of graphitized carbon in which spacing ($d_{002}$) of lattice planes (002) is in the range of 3.35 to 3.39 Å and the length (Lc) of a crystallite in the direction of the c axis is not less than 1000 Å, and the surface layer is composed of coating graphitized carbon in which spacing ($d_{002}$) of lattice planes (002) is in the range of 3.36 to 3.48 Å and is not less than the spacing ($d_{002}$) of lattice planes (002) in the graphitized carbon to be the core.

When the carbon material obtained by coating the graphitized carbon to be a core with the coating graphitized carbon is used for the cathode as in the first non-aqueous electrolyte battery according to the present invention, self-discharge is prevented from being induced upon reaction of lithium in the graphitized carbon to be a core with a solvent or the like in the non-aqueous electrolytic solution at the time of preservation by the coating graphitized carbon, whereby the battery capacity is hardly decreased at the time of the preservation, resulting in improved preservation characteristics in the non-aqueous electrolyte battery.

In a non-aqueous electrolyte battery comprising an anode, a cathode using a carbon material, and a non-aqueous electrolyte battery, a second non-aqueous electrolyte battery according to the present invention is characterized in that the carbon material is composed of a core and a surface layer, the core is coated with the surface layer, the core is composed of graphitized carbon in which spacing ($d_{002}$) of lattice planes (002) is in the range of 3.35 to 3.39 Å, and the surface layer is composed of a calcined product of an organic substance comprised of carbon containing sulfur atoms.

As in the second non-aqueous electrolyte battery according to the present invention, when the graphitized carbon in which spacing ($d_{002}$) of lattice planes (002) is in the range of 3.35 to 3.39 Å is coated with the calcined product of the organic substance composed of carbon containing sulfur atoms, lithium contained in a terminal of the graphitized carbon can be prevented from reacting with a solvent or the like in the non-aqueous electrolytic solution in contact therewith at the time of preservation, whereby self-discharge in the non-aqueous electrolyte battery is prevented, resulting in improved preservation characteristics.

In a lithium battery comprising an anode, a cathode using a carbon material, and a non-aqueous electrolytic solution, a third non-aqueous electrolyte battery according to the present invention is characterized in that multi-phase graphitized carbon having two or more crystals respectively having different crystallinities in one particle, the length (Lc) of a crystallite in the direction of the c axis in each of the crystals being not less than 10 Å, is used as the carbon material used for the cathode.

As in the third non-aqueous electrolyte battery according to the present invention, when the multi-phase graphitized carbon having two or more crystals respectively having different crystallinities in one particle, the length (Lc) of a crystallite in the direction of the c axis in each of the crystals being not less than 10 Å, is used as the carbon material used for the cathode, the discharge capacity per unit weight is increased by the crystal having high crystallinity in the carbon material, and the change in a potential at the cathode at the end of discharge becomes gradual by the crystal having low crystallinity. As a result, the non-aqueous electrolytic solution is also prevented from being decomposed upon reaction with the carbon material used for the cathode due to the rapid increase in the potential at the cathode at the end of the discharge as in the prior art, resulting in improved cycle characteristics in the non-aqueous electrolyte battery.

The foregoing and other objects, features, aspects and advantages of the present invention will become more apparent from the following detailed description of the present invention when taken in conjunction with the accompanying drawings.

PREFERRED EMBODIMENTS OF THE PRESENT INVENTION

Description is now made of preferred embodiments of first to third non-aqueous electrolyte batteries of the present invention.

In the first non-aqueous electrolyte battery, graphitized carbon in which spacing ($d_{002}$) of lattice planes (002) is in the range of 3.35 to 3.39 Å and the length (Lc) of a crystallite in the direction of the c axis is not less than 1000 Å is used as graphitized carbon to be a core of a carbon material used for its cathode is that such graphitized carbon is high in crystallinity and sufficiently occludes and discharges lithium ions, so that a large-capacity battery is obtained. Natural graphite is generally used as such graphitized carbon.

On the other hand, graphitized carbon in which spacing ($d_{002}$) of lattice planes (002) is in the range of 3.36 to 3.48 Å and is not less than the spacing ($d_{002}$) of lattice planes (002) in the graphitized carbon to be a core is used as coating graphitized carbon with which the graphitized carbon to be a core is to be coated in order to sufficiently prevent lithium in the graphitized carbon to be a core from reacting with a solvent or the like in a non-aqueous electrolytic solution. Artificial graphite is generally used as such coating graphitized carbon.

In coating the graphitized carbon to be a core with the coating graphitized carbon, if the amount of the coating graphitized carbon is small, the graphitized carbon to be a core cannot be sufficiently coated, so that lithium contained in the graphitized carbon to be a core cannot be sufficiently prevented from reacting with the solvent or the like in the non-aqueous electrolytic solution. On the other hand, if the amount thereof is too large, the amount of the graphitized carbon to be a core is decreased, so that the capability to occlude and discharge lithium ions at the cathode is decreased. Therefore, the amount of the coating graphitized carbon is set in the range of 0.1 to 60% by weight, preferably in the range of 1 to 50% by weight, and more preferably in the range of 10 to 30% by weight per the total amount of the graphitized carbon and the coating graphitized carbon.

In the above-mentioned second non-aqueous electrolyte battery, graphitized carbon in which spacing ($d_{002}$) of lattice planes (002) is in the range of 3.35 to 3.39 Å is used as a carbon material used for its cathode is that such graphitized carbon is high in crystallinity and sufficiently occludes and discharges lithium ions, so that a large-capacity battery is obtained, as in the case of the above-mentioned first non-aqueous electrolyte battery. Natural graphite is generally used.

On the other hand, in the second non-aqueous electrolyte battery, it is possible to use, as a calcined product of an organic substance composed of carbon containing sulfur atoms with which the surface of the graphitized carbon is to be coated, one obtained by calcining and graphitizing a pyrolytic product of an organic substance containing sulfur, for example, tar or pitch at temperatures in the vicinity of 2700° to 3000° C.

In coating the graphitized carbon with the calcined product of the organic substance, if the amount of the calcined product of the organic substance is small, the graphitized carbon cannot be sufficiently coated, so that lithium contained in the graphitized carbon cannot be sufficiently prevented from reacting with a solvent or the like in a non-aqueous electrolytic solution. On the other hand, if the amount of the calcined product of the organic substance is too large, the amount of the graphitized carbon used for the cathode is decreased, whereby the capability to occlude and discharge lithium ions at the cathode is decreased. Therefore, the amount of the calcined product of the organic substance is set in the range of 0.1 to 50% by weight, preferably in the range of 5 to 40% by weight, and more preferably in the range of 15 to 25% by weight per the total amount of the graphitized carbon and the calcined product of the organic substance.

Furthermore, if the amount of the sulfur atoms contained in the calcined product of the organic substance is small, it is impossible to sufficiently prevent the reaction between lithium contained in the graphitized carbon and the solvent or the like in the non-aqueous electrolytic solution. On the other hand, if the amount of the sulfur atoms is too large, the characteristics as a cathode material are decreased. Therefore, the ratio of the sulfur atoms to carbon atoms in the calcined product of the organic substance is set in the range of 0.01 to 20%, preferably 1 to 10%, and more preferably 5 to 7% by weight.

Furthermore, in each of the first to third non-aqueous electrolyte batteries in the present invention, it is possible to use, as an anode material used for its anode, a known anode material capable of occluding and discharging lithium ions which has been conventionally used. For example, a lithium transition metal composite oxide containing at least one of manganese, cobalt, nickel, iron, vanadium, and niobium can be used. Specifically, a known material such as $LiCoO_2$, $LiNiO_2$, $LiMnO_2$, or $LiFeO_2$ can be used.

Furthermore, it is possible to use, as the non-aqueous electrolytic solution used in each of the first to third non-aqueous electrolyte batteries, a known non-aqueous electrolytic solution which has been conventionally used.

As the solvent in the non-aqueous electrolytic solution, organic solvents such as ethylene carbonate, propylene carbonate, butylene carbonate, vinylene carbonate, cyclopentanone, sulfolane, dimethylsulfolane, 3-methyl-1, 3-oxazolidine-2-on, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1, 2-dimethoxyethane, tetrahydrofuran, 2-methyltetrahydrofuran, 1,3-dioxolane, methyl acetate, and ethyl acetate can be used independently or in combination.

Furthermore, in the non-aqueous electrolytic solution, lithium compounds such as $LiPF_6$, $LiBF_4$, $LiClO_4$, $LiCF_3SO_3$, $LiAsF_6$, $LiN(CF_3SO_2)_2$, $LiOSO_2$ and $(CF_2)_3CF_3$ can be used as a solute dissolved in the above-mentioned solvent.

The above-mentioned first to third non-aqueous electrolyte batteries will be described by taking more specific embodiments, and it will be made apparent that the non-aqueous electrolyte batteries according to the embodiment are superior in preservation characteristics, cycle characteristics and the like by consideration of the comparative examples.

EMBODIMENT 1

Figure 1:
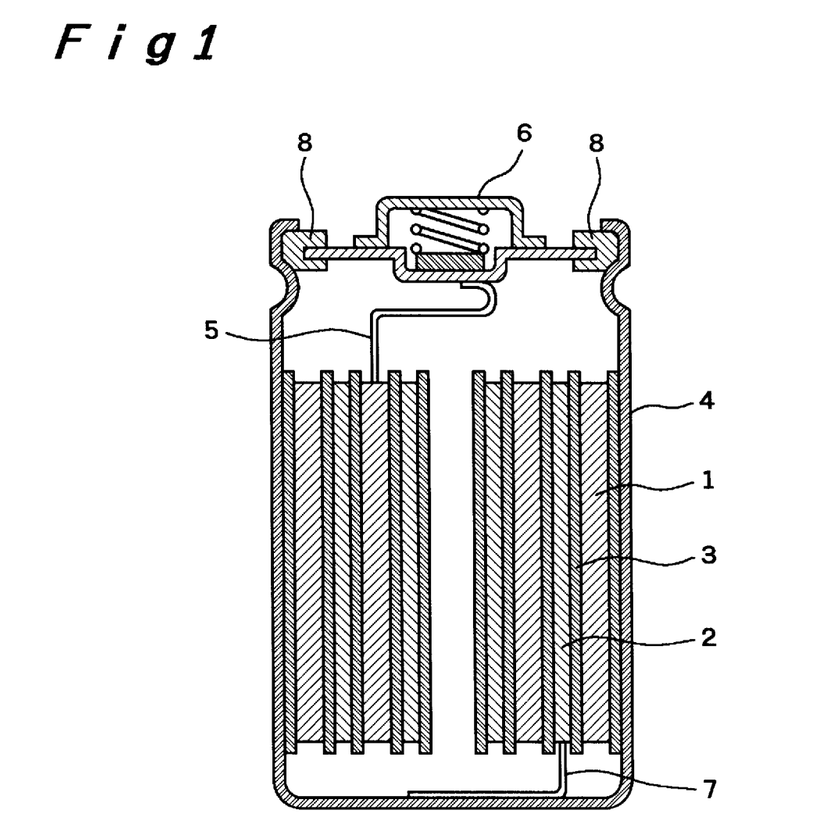
FIG. 1 is a sectional illustration showing the internal construction of non-aqueous electrolyte batteries in embodiments and comparative examples of the present invention.

In the present embodiment, an anode and a cathode produced in the following manner were used, and a non-aqueous electrolytic solution prepared in the following manner was used, to fabricate a cylindrical-type non-aqueous electrolyte secondary battery as shown in FIG. 1.

[Production of Anode]

In producing an anode, lithium-containing cobalt dioxide $LiCoO_2$ heat-treated at a temperature of 800° C. was used as an anode material. The heat treatment can be carried out at temperatures in the range of 700° to 900° C.

The anode material $LiCoO_2$, carbon powder which is a conductive agent, fluorocarbon polymer powder which is a binding agent were mixed in the weight ratio of 85:10:5. A mixture obtained was applied to an aluminum foil composing an anode-side collector, after which the mixture was heat-treated at a temperature of 150° C., to produce the anode. The heat treatment can be carried out at temperatures in the range of 100° to 200° C.

[Production of Cathode]

In producing a cathode, a material obtained by coating graphitized carbon to be a core in which spacing ($d_{002}$) of lattice planes (002) is 3.36 Å and the length (Lc) of a crystallite in the direction of the c axis is 2100 Å with coating graphitized carbon in which spacing ($d_{002}$) of lattice planes (002) is 3.40 Å so that the amount of the coating graphitized carbon is 20% by weight per the total amount of the graphitized carbon and the coating graphitized carbon was used as a cathode material. The cathode material and polyvinylidene fluoride, which is a binding agent, were mixed in the weight ratio of 95:5, and the mixture obtained was applied to a cathode-side collector composed of a copper foil, after which the mixture was heat-treated at a temperature of 200° C., to produce the cathode. The heat treatment can be carried out at temperatures in the range of 150° to 250° C.

[Preparation of Non-aqueous Electrolytic Solution]

In preparing a non-aqueous electrolytic solution, a mixed solvent obtained by mixing ethylene carbonate and 1, 2-dimethoxyethane in the volume ratio of 1:1 was used, and lithium hexafluorophosphate $LiPF_6$ was dissolved as a solute in the mixed solvent in the ratio of 1 mol/1, to prepare the non-aqueous electrolytic solution.

[Production of Battery]

In fabricating the non-aqueous electrolyte secondary battery according to the present embodiment, a microporous film made of polypropylene having permeability to lithium ions was interposed as a separator 3 between an anode 1 and a cathode 2 produced in the above-mentioned manner. The combined anode and cathode were contained upon being wound in a spiral shape in a battery can 4, after which the non-aqueous electrolytic solution was poured in the battery can 4 and the battery can 4 was sealed. The anode 1 was connected to an anode outer terminal 6 through an anode lead 5 and the cathode 2 was connected to the battery can 4 through a cathode lead 7, to electrically separate the battery can 4 and the anode outer terminal 6 from each other by an insulating packing 8.

COMPARATIVE EXAMPLES 1 TO 4

In the comparative examples, non-aqueous electrolyte secondary batteries were fabricated in the same manner as that in the embodiment 1 except that only the cathode material used was changed in the production of the cathode in the non-aqueous electrolyte secondary battery in embodiment 1.

In comparative example 1, only the graphitized carbon to be a core used in the embodiment 1 was used as the cathode material. In the comparative example 2, a material obtained by coating the graphitized carbon to be a core with 20% by weight of a silicon nitride whisker was used as the cathode material. In comparative example 3, a material obtained by coating the graphitized carbon to be a core with 20% by weight of coke in which spacing ($d_{002}$) of lattice planes (002) is 3.46 to 3.48 Å and the length (Lc) of a crystallite in the direction of the c axis is 15 to 20 Å was used as cathode material. In the comparative example 4, a material obtained by coating the graphitized carbon to be a core with 20% by weight of amorphous carbon composed of a carbide of 3, 5-dimethyl phenol formaldehyde resin was used as the cathode material.

Each of the non-aqueous electrolyte secondary batteries in embodiment 1 and comparative examples 1 to 4 fabricated in the above-mentioned manner was discharged to a final discharge voltage of 2.75 V at a discharge current of 200 mA before preservation and after preservation for two months at a temperatures of 60° C., respectively, to measure discharge capacities before the preservation and after the preservation, to find the self-discharge rate (%) of the non-aqueous electrolyte secondary battery after the preservation for two months in the above-mentioned manner. The results are shown in the following Table 1.

TABLE 1

|  | embodiment | comparative example | | | |
|---|---|---|---|---|---|
|  | 1 | 1 | 2 | 3 | 4 |
| self-discharge rate (%) | 7.1 | 12.4 | 12.1 | 11.3 | 11.1 |

As a result, the non-aqueous electrolyte secondary battery in embodiment 1 in which the graphitized carbon to be a core is coated with the coating graphitized carbon was lower in the self-discharge rate than the non-aqueous electrolyte secondary battery in comparative example 1 in which the graphitized carbon to be a core is not coated and the non-aqueous electrolyte secondary batteries in the comparative examples 2 to 4 in which the graphitized carbon to be a core is coated with the silicon nitride whisker, the coke and the carbide of 3, 5-dimethyl phenol formaldehyde resin.

EMBODIMENT 2

In this embodiment, a non-aqueous electrolyte secondary battery was fabricated in the same manner as that in the above-mentioned embodiment 1 except that a mixed solvent obtained by mixing propylene carbonate and 1, 2-dimethoxyethane in the volume ratio of 1:1 was used as a solvent in the preparation of the non-aqueous electrolytic solution in the non-aqueous electrolyte secondary battery in the embodiment 1.

COMPARATIVE EXAMPLES 5 TO 8

In the comparative examples, non-aqueous electrolyte secondary batteries were fabricated in the same manner as that in the above-mentioned embodiment 1 except that a mixed solvent obtained by mixing propylene carbonate and 1, 2-dimethoxyethane in the volume ratio of 1:1 was used as in the above-mentioned embodiment 2 as a solvent in a non-aqueous electrolytic solution, and only graphitized carbon to be a core as in the above-mentioned comparative example 1, a material obtained by coating graphitized carbon to be a core with a silicon nitride whisker as in the above-mentioned comparative example 2, a material obtained by coating graphitized carbon to be a core with coke as in the above-mentioned comparative example 3, and a material obtained by coating graphitized carbon to be a core with a carbide of 3, 5-dimethyl phenol formaldehyde resin as in the above-mentioned comparative example 4 were respectively used as cathode materials in comparative example 5, comparative example 6, comparative example 7, and comparative example 8.

With respect to each of the non-aqueous electrolyte secondary batteries in embodiment 2 and comparative examples 5 to 8 fabricated in the above-mentioned manner, discharge capacities before preservation and after preservation for two months at a temperature of 60° C. were also measured in the same manner as the foregoing, to find the self-discharge rate (%) of the non-aqueous electrolyte secondary battery after preservation for two months. The results are shown in the following Table 2.

TABLE 2

|  | embodiment | comparative example | | | |
|---|---|---|---|---|---|
|  | 2 | 5 | 6 | 7 | 8 |
| self-discharge rate (%) | 7.3 | 12.6 | 12.4 | 11.6 | 11.3 |

As a result, even when the type of the solvent used in the non-aqueous electrolytic solution was changed, the non-aqueous electrolyte secondary battery in the embodiment 2 in which the graphitized carbon to be a core is coated with the coating graphitized carbon was lower in the self-discharge rate than the non-aqueous electrolyte secondary batteries in the comparative examples 5 to 8, as in case of embodiment 1 and comparative examples 1 to 4.

EXPERIMENTAL EXAMPLE 1

In the experimental example, in coating the graphitized carbon to be a core with the coating graphitized carbon in the production of the cathode in the non-aqueous electrolyte secondary battery in the embodiment 1, the amount of the coating graphitized carbon was changed in the range of 0 to 70% by weight as shown in the following Table 3 per the total amount of the graphitized carbon and the coating graphitized carbon, to fabricate respective non-aqueous electrolyte secondary batteries.

Each of the non-aqueous electrolyte secondary batteries was preserved for two months at a temperature of 60° C., and was then discharged to a final discharge voltage of 2.75 V at a discharge current of 200 mA as described above, to examine a discharge capacity in the non-aqueous electrolyte secondary battery after the preservation. The results are shown in the following Table 3 and FIG. 2. A discharge capacity before the preservation in the non-aqueous electrolyte secondary battery was 600 mAh.

TABLE 3

Figure 2:
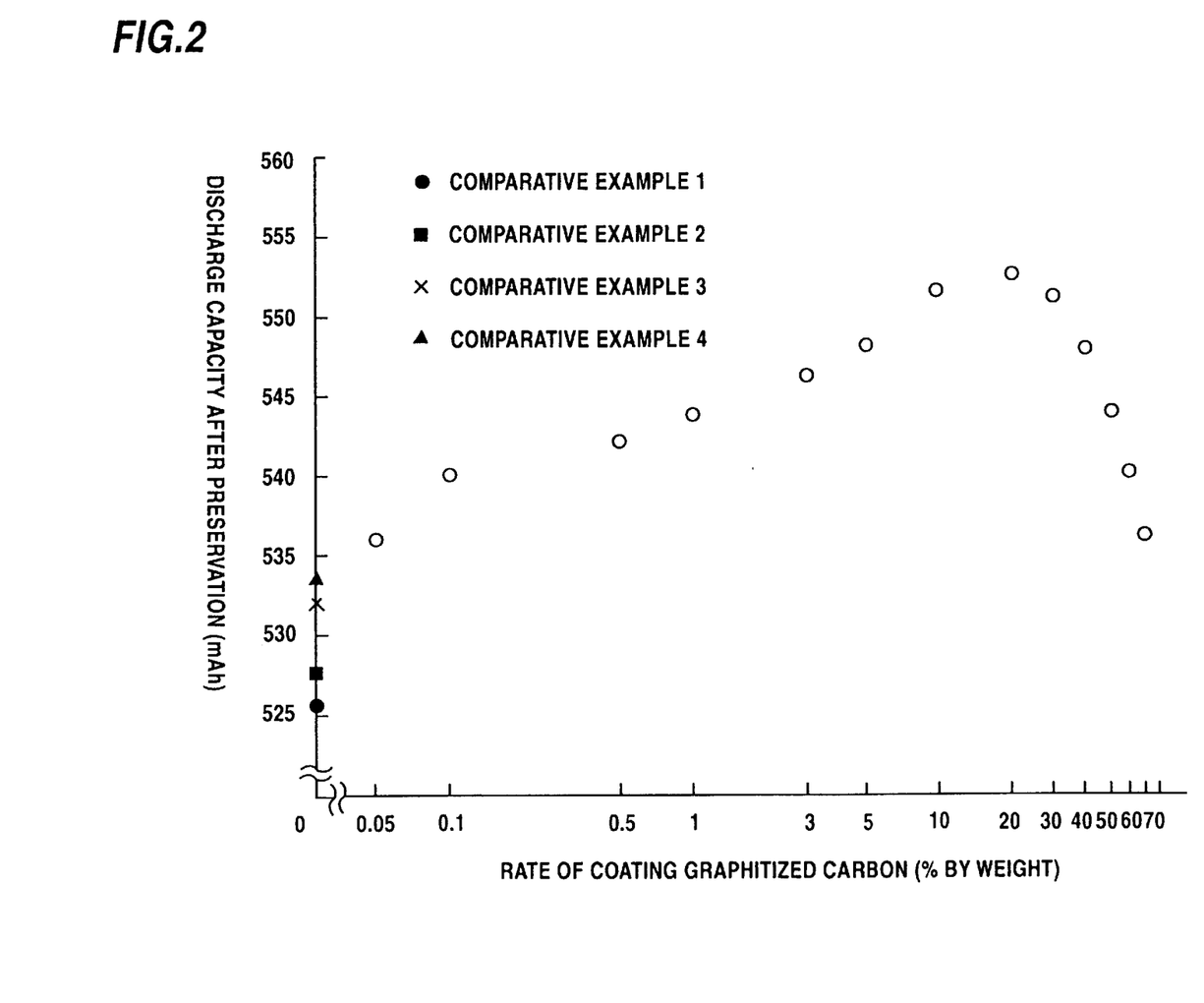
FIG. 2 is a diagram showing the relationship between the amount of coating graphitized carbon with which graphitized carbon to be a core is coated and a discharge capacity after preservation in an experimental example 1.

| coating amount (% by weight) | 0 | 0.05 | 0.1 | 0.5 | 1 | 3 | 5 |
|---|---|---|---|---|---|---|---|
| discharge capacity (mAh) | 526 | 536 | 540 | 542 | 544 | 546 | 548 |
| coating amount (% by weight) | 10 | 20 | 30 | 40 | 50 | 60 | 70 |
| discharge capacity (mAh) | 551 | 557 | 551 | 548 | 544 | 540 | 536 |

As a result, the non-aqueous electrolyte secondary battery in which the graphitized carbon to be a core is coated with the coating graphitized carbon was significantly improved in the discharge capacity after the preservation, as compared with the non-aqueous electrolyte secondary battery in which the graphitized carbon to be a core is not coated. When the graphitized carbon to be a core was coated with the coating graphitized carbon, the decrease in the discharge capacity after the preservation was reduced when the amount of the coating graphitized carbon was in the range of 0.1 to 60% by weight, preferably in the range of 1 to 50% by weight, and more preferably in the range of 10 to 30% by weight per the total amount of the graphitized carbon and the coating graphitized carbon, whereby a non-aqueous electrolyte secondary battery superior in preservation characteristics was obtained.

EXPERIMENTAL EXAMPLE 2

In the experimental example, in coating the graphitized carbon to be a core with the coating graphitized carbon in the production of the cathode in the non-aqueous electrolyte secondary battery in embodiment 1, coating graphitized carbons in which spacing ($d_{002}$) of lattice planes (002) is in the range of 3.36 to 3.49 Å as shown in the following Table 4 were used as the coating graphitized carbon, to fabricate respective non-aqueous electrolyte secondary batteries.

With respect to each of the non-aqueous electrolyte secondary batteries, a discharge capacity after preservation for two months at a temperature of 60° C. in the non-aqueous electrolyte battery was also examined in the same manner as that in the above-mentioned experimental example 1. The results are shown in the following Table 4 and FIG. 3. A discharge capacity before the preservation in the non-aqueous electrolyte secondary battery was 600 mAh.

TABLE 4

Figure 3:
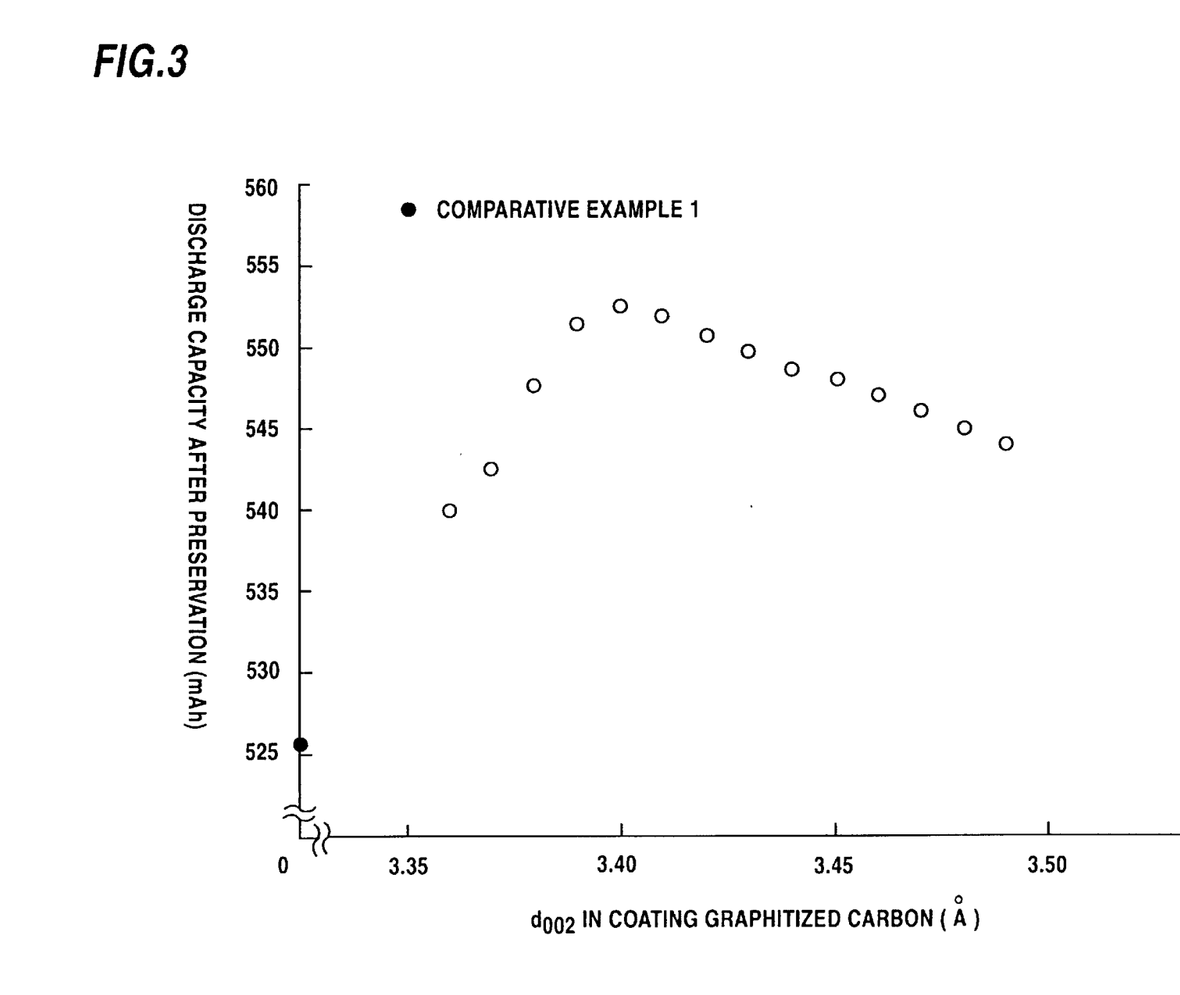
FIG. 3 is a diagram showing the relationship between spacing ($d_{002}$) of lattice planes (002) in coating graphitized carbon with which graphitized carbon to be a core is coated and a discharge capacity after preservation in an experimental example 2.

| $d_{002}$(Å) in coating graphitized carbon | 3.36 | 3.37 | 3.38 | 3.39 | 3.40 | 3.41 | 3.42 |
|---|---|---|---|---|---|---|---|
| discharge capacity (mAh) | 540 | 543 | 548 | 551 | 553 | 552 | 551 |
| $d_{002}$(Å) in coating graphitized carbon | 3.43 | 3.44 | 3.45 | 3.46 | 3.46 | 3.48 | 3.49 |
| discharge capacity (mAh) | 550 | 549 | 548 | 547 | 546 | 545 | 544 |

As a result, in coating the graphitized carbon to be a core in which spacing ($d_{002}$) of lattice planes (002) is 3.36 Å with the coating graphitized carbon as described above, when the graphitized carbon to be a core was coated with the coating graphitized carbon in which spacing ($d_{002}$) of lattice planes (002) is in the range of 3.36 to 3.49 Å and is not less than the spacing ($d_{002}$) of lattice planes (002) in the graphitized carbon to be a core, the discharge capacity after the preservation was significantly improved, as compared with that in a case where the graphitized carbon to be a core is not coated.

EMBODIMENT 3

In the present embodiment, an anode and a cathode produced in the following manner were used, and a non-aqueous electrolytic solution prepared in the following manner was used, to fabricate a cylindrical-type non-aqueous electrolyte secondary battery as shown in FIG. 1 in the same manner as that in the above-mentioned embodiment 1.
[Production of Anode]
In producing an anode, lithium-containing cobalt dioxide $LiCoO_2$ heat-treated at a temperature of 800° C. was used as an anode material. The heat treatment can be carried out at temperatures in the range of 700° to 900° C.

The anode material $LiCoO_2$, carbon powder which is a conductive agent, fluorocarbon polymer powder which is a binding agent were mixed in the weight ratio of 85:10:5. A mixture obtained was applied to an anode-side collector composed of an aluminum foil, after which the mixture was heat-treated at a temperature of 150° C., to produce the anode. The heat treatment can be carried out at temperatures in the range of 100° to 200° C.
[Production of Cathode]
In producing a cathode, a material obtained by coating graphitized carbon in which spacing ($d_{002}$) of lattice planes (002) is in the range of 3.35 to 3.39 Å with 20% by weight of a calcined product of an organic substance in which the ratio of sulfur atoms to the number of carbon atoms is 6% was used as a cathode material, the cathode material and polyvinylidene fluoride which is a binding agent were mixed in the weight ratio of 95:5, and a mixture obtained was applied to a cathode-side collector composed of a copper foil, after which the mixture was heat-treated at a temperature of 200° C., to produce the cathode. The heat treatment can be carried out at temperatures in the range of 150° to 250° C.
[Preparation of Non-aqueous Electrolytic Solution]
In preparing a non-aqueous electrolytic solution, a mixed solvent obtained by mixing ethylene carbonate and 1,2-dimethoxyethane in the volume ratio of 1:1 was used, and lithium hexafluorophosphate $LiPF_6$ was dissolved as a solute in the mixed solvent in the ratio of 1 mol/l, to prepare the non-aqueous electrolytic solution.

COMPARATIVE EXAMPLES 9 TO 12

In the comparative examples, non-aqueous electrolyte secondary batteries were fabricated in the same manner as that in the above-mentioned embodiment 3 except that only the cathode material used was changed in the production of the cathode in the non-aqueous electrolyte secondary battery in the embodiment 3.

Only graphitized carbon used in embodiment 1, a material obtained by coating the graphitized carbon with 20% by weight of a silicon nitride whisker, a material obtained by coating the graphitized carbon with 20% by weight of coke in which spacing ($d_{002}$) of lattice planes (002) is 3.46 to 3.48 Å and the length (Lc) of a crystallite in the direction of the c axis is 10 to 20 Å, and a material obtained by coating the graphitized carbon with 20% by weight of a carbide of 3,5-dimethyl phenol formaldehyde resin were respectively used as cathode materials in comparative example 9, comparative example 10, comparative example 11, and comparative example 12.

Each of the non-aqueous electrolyte secondary batteries in embodiment 3 and comparative examples 9 to 12 fabricated using the above-mentioned cathode materials was discharged to a final discharge voltage of 2.75 V at a discharge current of 200 mA, respectively, before preservation and after preservation for two months at a temperature of 60° C. to measure discharge capacities before the preservation and after the preservation, to find the self-discharge rate (%) of the non-aqueous electrolyte secondary battery after the preservation for two months in the above-mentioned manner. The results are shown in the following Table 1.

TABLE 5

| | embodiment | comparative example | | | |
|---|---|---|---|---|---|
| | 3 | 9 | 10 | 11 | 12 |
| self-discharge rate (%) | 3.1 | 12.4 | 12.1 | 11.3 | 11.1 |

As a result, the non-aqueous electrolyte secondary battery in embodiment 3 in which the graphitized carbon is coated with the calcined product of the organic substance composed of carbon containing sulfur atoms was much lower in the self-discharge rate than the non-aqueous electrolyte secondary battery in the comparative example 9 in which the graphitized carbon is not coated and the non-aqueous electrolyte secondary batteries in comparative examples 10 to 12 in which the graphitized carbon is coated with the silicon nitride whisker, the coke and the calcined product of the organic substance containing no sulfur atoms.

EMBODIMENT 4

In the embodiment, a non-aqueous electrolyte secondary battery was fabricated in the same manner as that in the above-mentioned embodiment 3 except that a mixed solvent obtained by mixing propylene carbonate and 1, 2-dimethoxyethane in the volume ratio of 1:1 was used as a solvent in the production of the non-aqueous electrolytic solution in the non-aqueous electrolyte secondary battery in embodiment 3.

COMPARATIVE EXAMPLES 13 TO 16

In the comparative examples, non-aqueous electrolyte secondary batteries were fabricated in the same manner as that in the above-mentioned embodiment 3 except that a mixed solvent obtained by mixing propylene carbonate and 1, 2-dimethoxyethane in the volume ratio of 1:1 was used as in the above-mentioned embodiment 4 as a solvent in a non-aqueous electrolytic solution, and only graphitized carbon as in the above-mentioned comparative example 9, a material obtained by coating graphitized carbon with a silicon nitride whisker as in the above-mentioned comparative example 10, a material obtained by coating graphitized carbon with coke as in the above-mentioned comparative example 11, and a material obtained by coating graphitized carbon with a carbide of 3, 5-dimethyl phenol formaldehyde resin as in the above-mentioned comparative example 12 were respectively used as cathode materials in the comparative example 13, the comparative example 14, the comparative example 15, and the comparative example 16.

With respect to each of the non-aqueous electrolyte secondary batteries in embodiment 4 and comparative examples 13 to 16 fabricated in the above-mentioned manner, discharge capacities before preservation and after preservation for two months at a temperature of 60° C. were measured in the same manner as the foregoing, to find the self-discharge rate (%) of the non-aqueous electrolyte secondary battery after the preservation for two months. The results are shown in the following Table 6.

TABLE 6

|  | embodiment | comparative example | | | |
| --- | --- | --- | --- | --- | --- |
|  | 4 | 13 | 14 | 15 | 16 |
| self-discharge rate (%) | 3.2 | 12.6 | 12.4 | 11.7 | 11.3 |

As a result, even when the type of the solvent used in the non-aqueous electrolytic solution was changed, the non-aqueous electrolyte secondary battery in embodiment 4 in which the graphitized carbon is coated with carbon containing sulfur atoms was much lower in the self-discharge rate than the non-aqueous electrolyte secondary batteries in comparative examples 13 to 16, as in case of the embodiment 3 and comparative examples 9 to 12.

EXPERIMENTAL EXAMPLE 3

In the experimental example, in coating the graphitized carbon with the calcined product of the organic substance composed of carbon containing sulfur atoms in the production of the cathode in the non-aqueous electrolyte secondary battery in embodiment 3, the amount of the calcined product of the organic substance was changed in the range of 0 to 55% by weight as shown in the following Table 7 per the total amount of the graphitized carbon and the calcined product of the organic substance, to fabricate respective non-aqueous electrolyte secondary batteries.

Each of the non-aqueous electrolyte secondary batteries thus fabricated was preserved for two months at a temperature of 60° C., and was then discharged to a final discharge voltage of 2.75 V at a discharge current of 200 mA as described above, to examine a discharge capacity in the non-aqueous electrolyte secondary battery after the preservation. The results are shown in the following Table 7 and FIG. 4. A discharge capacity before the preservation in the non-aqueous electrolyte secondary battery was 600 mAh.

TABLE 7

Figure 4:
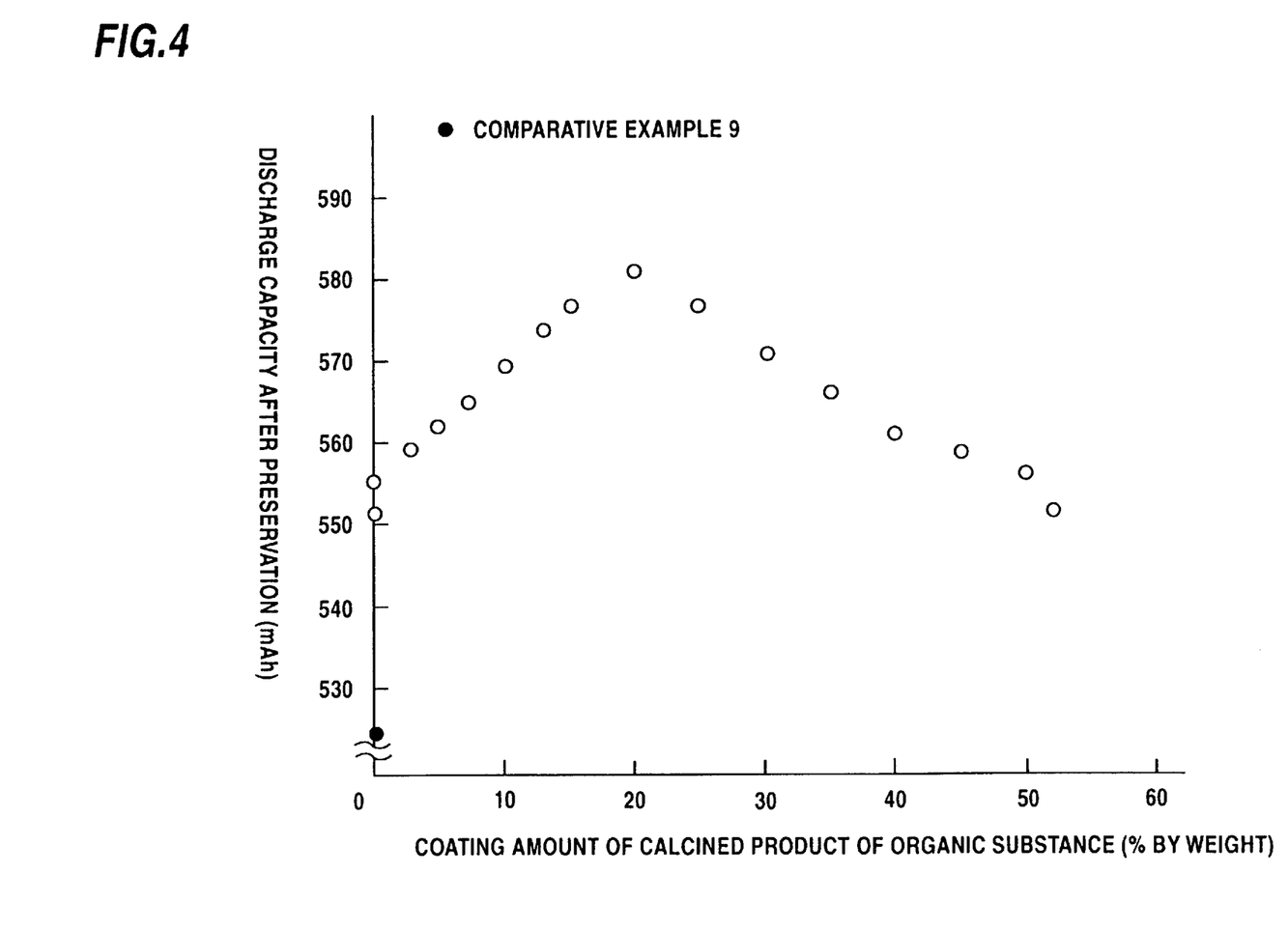
FIG. 4 is a diagram showing the relationship between the amount of a calcined product of an organic substance composed of carbon containing sulfur atoms with which graphitized carbon is coated and a discharge capacity after preservation in an experimental example 3.

| coating amount (% by weight) | 0 | 0.05 | 0.1 | 3 | 5 | 7 | 10 | 13 | 15 |
| --- | --- | --- | --- | --- | --- | --- | --- | --- | --- |
| discharge capacity (mAh) | 526 | 551 | 556 | 559 | 562 | 565 | 569 | 573 | 577 |
| coating amount (% by weight) | 20 | 25 | 30 | 35 | 40 | 45 | 50 | 55 | |
| discharge capacity (mAh) | 581 | 577 | 571 | 566 | 562 | 558 | 556 | 551 | |

As a result, the non-aqueous electrolyte secondary battery in which the graphitized carbon is coated with the calcined product of the organic substance composed of carbon containing sulfur atoms as described above was significantly improved in the discharge capacity after the preservation, as compared with the non-aqueous electrolyte secondary battery in which the graphitized carbon is not coated in comparative example 9. When the graphitized carbon was coated with the calcined product of the organic substance composed of carbon containing sulfur atoms, the decrease in the discharge capacity after the preservation was reduced when the amount of the calcined product of the organic substance was in the range of 0.1 to 50% by weight, preferably in the range of 5 to 40% by weight, and more preferably in the range of 15 to 25% by weight per the total amount of the graphitized carbon and the calcined product of the organic substance, whereby a non-aqueous electrolyte secondary battery superior in preservation characteristics was obtained.

EXPERIMENTAL EXAMPLE 4

In the experimental example, in coating the graphitized carbon with the calcined product of the organic substance composed of carbon containing sulfur atoms in the production of the cathode in the non-aqueous electrolyte secondary battery in embodiment 3, examples of the calcined product of the organic substance were ones which differ in the ratio of the number of sulfur atoms to the number of carbon atoms, and the graphitized carbon was coated with 20% by weight of the respective calcined products of the organic substances which differ in the ratio of the number of the sulfur atoms, to fabricate respective non-aqueous electrolyte secondary batteries.

Figure 5:
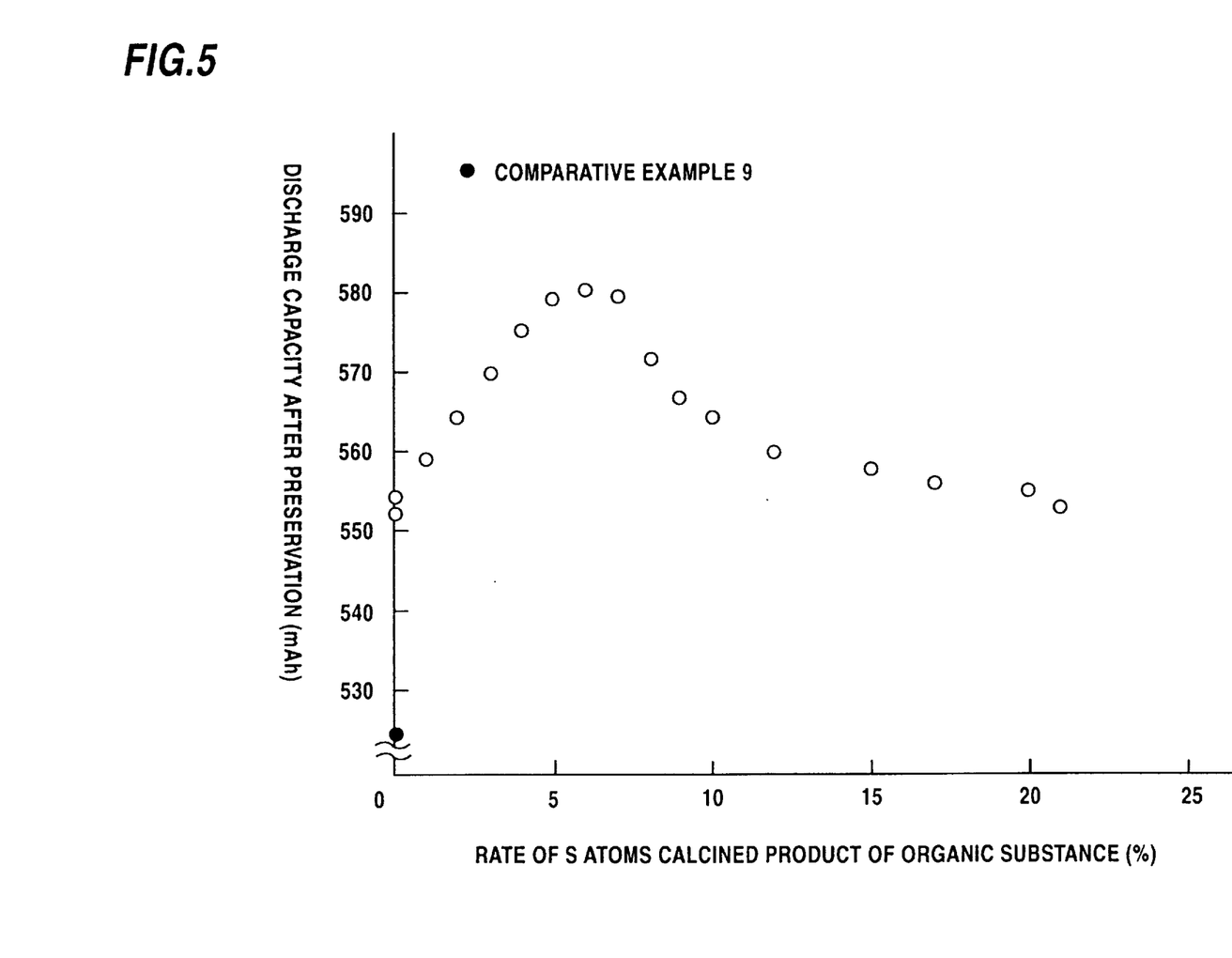
FIG. 5 is a diagram showing the relationship between the ratio of sulfur atoms to carbon atoms in a calcined product of an organic substance with which graphitized carbon is coated and a discharge capacity after preservation in an experimental example 4.

With respect to each of the non-aqueous electrolyte secondary batteries thus fabricated, a discharge capacity after preservation for two months at a temperature of 60° C. in the non-aqueous electrolyte battery was also examined in the same manner as that in the above-mentioned experimental example 3. The results are shown in FIG. 5. A discharge capacity before the preservation in the non-aqueous electrolyte secondary battery was 600 mAh.

As a result, when the graphitized carbon was coated with the calcined product of the organic substance composed of carbon containing sulfur atoms, the discharge capacity after the preservation was significantly improved, as compared with that in comparative example 9 in which the graphitized carbon is not coated. When the graphitized carbon was coated with the calcined product of the organic substance composed of carbon containing sulfur ions, the decrease in the discharge capacity after the preservation was reduced when the ratio of the number of sulfur atoms to the number of carbon atoms in the calcined product of the organic substance was in the range of 0.01 to 20%, preferably in the range of 1 to 10%, and more preferably in the range of 5 to 7%, whereby a non-aqueous electrolyte secondary battery superior in preservation characteristics was obtained.

EMBODIMENT 5

In the present embodiment, an anode and a cathode produced in the following manner were used, and a non-aqueous electrolytic solution prepared in the following manner was used, to fabricate a cylindrical-type non-aqueous electrolyte secondary battery as shown in FIG. 1 in the same manner as that in the above-mentioned embodiment 1.

[Production of Anode]

In producing an anode, lithium-containing cobalt dioxide $LiCoO_2$ heat-treated at a temperature of approximately 850° C. was used as an anode material. The anode material $LiCoO_2$, carbon powder which is a conductive agent, and fluorocarbon polymer powder which is a binding agent were mixed in the weight ratio of 85:10:5 in water. A mixture obtained was brought into a slurry, and the slurry was applied to a collector composed of an aluminum foil having a thickness of 12 $\mu$m, after which the slurry was heat-treated at temperatures of 100° to 150° C., to produce the anode.

[Production of Cathode]

In producing a cathode, a carbide of phenol resin was heat-treated for one hour at a temperature of 1700° C. in a nitrogen atmosphere under high pressure of 0.5 GPa using a high-pressure electric furnace, to obtain a carbon material used for the cathode.

Then the carbon material was analyzed by an X-ray diffraction method. In this case, peaks were respectively observed at positions of 26.6° and 26° in a diffraction pattern of a lattice plane (002) and observed at positions of 54.6° and 53.5° in a diffraction pattern of a lattice plane (004). As can be seen from the results of the measurement, the carbon material had a two-phase graphite structure having two different crystallinities in one particle because spacing ($d_{002}$) of lattice planes (002) in the carbon material took two different values of 3.36 Å and 3.43 Å.

Furthermore, in the carbon material having the two-phase graphite structure having two different crystallinities, the length (Lc) of a crystallite in the direction of the c axis was found. As a result, the length (Lc) was 500 Å in a portion having high crystallinity, and was 20 Å in a portion having low crystallinity.

The above-mentioned carbon material having the two-phase graphite structure, a binding agent composed of styrene-butadiene rubber, and a thickening agent composed of carboxymethylcellulose were mixed in the weight ratio of 98.5:0.5:1, and 1.8 kg of water was added to 1 kg of a mixture obtained, and the mixture was kneaded for one hour to be brought into a slurry, after which the slurry was applied to a collector composed of a copper foil having a thickness of 18 $\mu$m, and was then heat-treated at temperatures of 150° to 200° C., to produce the cathode.

[Preparation of Non-aqueous Electrolytic Solution]

In preparing a non-aqueous electrolytic solution, 1 mol/l of lithium hexafluorophosphate $LiPF_6$ was dissolved as a solute in a mixed solvent obtained by mixing ethylene carbonate and diethyl carbonate in the volume ratio of 1:1, to prepare the non-aqueous electrolytic solution.

EMBODIMENT 6

In the present embodiment, a non-aqueous electrolyte secondary battery was fabricated in the same manner as that in the above-mentioned embodiment 5 except that in obtaining a carbon material used for a cathode, a carbide of polyvinylidene chloride was heat-treated for one hour at a temperature of 1500° C. in a nitrogen atmosphere under high pressure of 0.3 GPa using a high-pressure electric furnace, and a carbon material thus obtained was used for a cathode in the production of the cathode in the non-aqueous electrolyte secondary battery in the embodiment 5.

The above-mentioned carbon material was analyzed by an X-ray diffraction method in the same manner as that in the embodiment 1. In this case, spacing ($d_{002}$) of lattice planes (002) took two different values of 3.36 Å and 3.42 Å, the carbon material also had a two-phase graphite structure having two different crystallinities in one particle, and the length (Lc) of a crystallite in the direction of the c axis was 400 Å in a portion having high crystallinity and was 11 Å in a portion having low crystallinity.

EMBODIMENT 7

In the present embodiment, a non-aqueous electrolyte secondary battery was fabricated in the same manner as that in the above-mentioned embodiment 5 except that in obtaining a carbon material used for a cathode, a carbide of sugar was heat-treated for one hour at a temperature of 1900° C. in a nitrogen atmosphere under high pressure of 0.7 GPa using a high-pressure electric furnace, and a carbon material thus obtained was used for a cathode in the production of the cathode in the non-aqueous electrolyte secondary battery in embodiment 5.

The above-mentioned carbon material was analyzed by an X-ray diffraction method in the same manner as that in embodiment 5. In this case, spacing ($d_{002}$) of lattice planes (002) took two different values of 3.35 Å and 3.40 Å, the carbon material had a two-phase graphite structure having two different crystallinities in one particle, and the length (Lc) of a crystallite in the direction of the c axis was 600 Å in a portion having high crystallinity and 30 Å in a portion having low crystallinity.

EMBODIMENT 8

In the present embodiment, a non-aqueous electrolyte secondary battery was fabricated in the same manner as that in the above-mentioned embodiment 5 except that in obtaining a carbon material used for a cathode, charcoal was heat-treated for one hour at a temperature of 2500° C. in a nitrogen atmosphere under atmospheric pressure using an electric furnace, and a carbon material thus obtained was used for a cathode in the production of the cathode in the non-aqueous electrolyte secondary battery in embodiment 5.

The above-mentioned carbon material was analyzed by an X-ray diffraction method in the same manner as that in embodiment 5. In this case, spacing ($d_{002}$) of lattice planes (002) took three different values of 3.36 Å, 3.43 Å and 3.45 Å, the carbon material also had a graphite structure having three different crystallinities in one particle, and the length (Lc) of a crystallite in the direction of the c axis was 800 Å in a portion having high crystallinity and was 50 Å and 30 Å in portions having low crystallinities.

EMBODIMENT 9

In the present embodiment, a non-aqueous electrolyte secondary battery was fabricated in the same manner as that in the above-mentioned embodiment 5 except that in obtaining a carbon material used for a cathode, a carbide of phenol resin and a carbide of polyvinyl chloride were mixed in the weight ratio of 3:1, a mixture obtained was heat-treated for one hour at a temperature of 2800° C. in a nitrogen atmosphere under atmospheric pressure using an electric furnace, and a carbon material thus obtained was used for a cathode in the production of the cathode in the non-aqueous electrolyte secondary battery in embodiment 5.

The above-mentioned carbon material was analyzed by an X-ray diffraction method in the same manner as that in embodiment 5. In this case, spacing ($d_{002}$) of lattice planes (002) took three different values of 3.36 Å, 3.40 Å and 3.43 Å, the carbon material had a graphite structure having three different crystallinities in one particle, and the length (Lc) of a crystallite in the direction of the c axis was 950 Å in a portion having high crystallinity and was 70 Å and 50 Å in portions having low crystallinities.

EMBODIMENT 10

In the present embodiment, a non-aqueous electrolyte secondary battery was fabricated in the same manner as that in the above-mentioned embodiment 5 except that in obtaining a carbon material used for a cathode, natural graphite and a carbide of polyvinyl chloride were mixed in the weight ratio of 3:1, a mixture obtained was heat-treated for one hour at a temperature of 2800° C. in a nitrogen atmosphere under atmospheric pressure using an electric furnace, and a carbon material thus obtained was used for a cathode in the production of the cathode in the non-aqueous electrolyte secondary battery in embodiment 5.

The above-mentioned carbon material was analyzed by an X-ray diffraction method in the same manner as that in embodiment 5. In this case, spacing ($d_{002}$) of lattice planes (002) took three different values of 3.35 Å, 3.36 Å and 3.43 Å, the carbon material has a graphite structure having three different crystallinities in one particle, and the length (Lc) of a crystallite in the direction of the c axis was 960 Å in a portion having high crystallinity and was 75 Å and 45 Å in portions having low crystallinities.

EMBODIMENT 11

In the present embodiment, a non-aqueous electrolyte secondary battery was fabricated in the same manner as that in the above-mentioned embodiment 5 except that in obtaining a carbon material used for a cathode, coal pitch and a carbide of polyvinyl chloride were mixed in the weight ratio of 9:1, a mixture obtained was heat-treated for ten hours at a temperature of 2800° C. in a nitrogen atmosphere under atmospheric pressure using an electric furnace, and a carbon material thus obtained was used for a cathode in the production of the cathode in the non-aqueous electrolyte secondary battery in embodiment 5.

The above-mentioned carbon material was analyzed by an X-ray diffraction method in the same manner as that in embodiment 5. In this case, spacing ($d_{002}$) of lattice planes (002) took two different values of 3.36 Å and 3.43 Å, the carbon material had a graphite structure having two different crystallinities in one particle, and the length (Lc) of a crystallite in the direction of the c axis was 1000 Å in a portion having high crystallinity and was 55 Å in portions having low crystallinity.

COMPARATIVE EXAMPLE 17

In the comparative example, a non-aqueous electrolyte secondary battery was fabricated in the same manner as that in the above-mentioned embodiment 5 except that natural graphite was used as a carbon material used for a cathode in the production of the cathode in the non-aqueous electrolyte secondary battery in embodiment 5. In the natural graphite used for the cathode, spacing ($d_{002}$) of lattice planes (002) was 3.35 Å, and the length (Lc) of a crystallite in direction of the c axis was not less than 1000 Å.

COMPARATIVE EXAMPLE 18

In the comparative example, a non-aqueous electrolyte secondary battery was fabricated in the same manner as that in the above-mentioned embodiment 5 except that artificial graphite obtained by heat-treating coal coke for ten hours at a temperature of 2800° C. in a nitrogen atmosphere was used as a carbon material used for a cathode in the production of the cathode in the non-aqueous electrolyte secondary battery in the embodiment 5. In the artificial graphite used for the cathode, spacing ($d_{002}$) of lattice planes (002) was 3.36 Å, and the length (Lc) of a crystallite in the direction of the c axis was 800 Å.

COMPARATIVE EXAMPLE 19

In the comparative example, a non-aqueous electrolyte secondary battery was fabricated in the same manner as that in the above-mentioned embodiment 5 except that a carbon material obtained by heat-treating coal coke for ten hours at a temperature of 1200° C. in a nitrogen atmosphere under atmospheric pressure was used as a carbon material used for a cathode in the production of the cathode in the non-aqueous electrolyte secondary battery in embodiment 5. In the carbon material, spacing ($d_{002}$) of lattice planes (002) was 3.40 Å, and the length (Lc) of a crystallite in the direction of the c axis was 20 Å.

COMPARATIVE EXAMPLE 20

In the comparative example, a non-aqueous electrolyte secondary battery was fabricated in the same manner as that in the above-mentioned embodiment 5 except that a carbon material obtained by heat-treating a carbide of polyvinylidene chloride at a temperature of 1500° C. in a nitrogen atmosphere under atmospheric pressure was used as a carbon material used for a cathode in the production of the cathode in the non-aqueous electrolyte secondary battery in embodiment 5. In the carbon material, spacing ($d_{002}$) of lattice planes (002) was 3.43 Å, and the length (Lc) of a crystallite in the direction of the c axis was 10 Å.

COMPARATIVE EXAMPLE 21

In the comparative example, a non-aqueous electrolyte secondary battery was fabricated in the same manner as that in the above-mentioned embodiment 5 except that a carbon material obtained by heat-treating a carbide of phenol resin at a temperature of 1500° C. in a nitrogen atmosphere under atmospheric pressure was used as a carbon material used for a cathode in the production of the cathode in the non-aqueous electrolyte secondary battery in embodiment 5. In the carbon material, spacing ($d_{002}$) of lattice planes (002) was 3.45 Å, and the length (Lc) of a crystallite in the direction of the c axis was 15 Å.

COMPARATIVE EXAMPLE 22

In the comparative example, a non-aqueous electrolyte secondary battery was fabricated in the same manner as that in the above-mentioned embodiment 5 except that a carbon material obtained by mixing coal coke obtained by heat treatment at a temperature of 1200° C. under a nitrogen atmosphere and natural graphite in the weight ratio of 1:4 was used as a carbon material used for a cathode in the production of the cathode in the non-aqueous electrolyte secondary battery in embodiment 5. In the carbon material, spacing ($d_{002}$) of lattice planes (002) in the coal coke was 3.40 Å, and spacing ($d_{002}$) of lattice planes (002) in the natural graphite was 3.35 Å, and the length (Lc) of a crystallite in the direction of the c axis was 15 Å in the coal coke and was not less than 1000 Å in the natural graphite.

COMPARATIVE EXAMPLE 23

In the comparative example, a non-aqueous electrolyte secondary battery was fabricated in the same manner as that in the above-mentioned embodiment 5 except that a carbon material obtained by mixing powder of natural graphite and a carbide of 3, 5-dimethyl phenol formaldehyde resin in the weight ratio of 95:5, then calcining a mixture obtained for two hours at a temperature of 1000° C. in a nitrogen atmosphere, and coating the surface of the natural graphite with the carbide of 3, 5-dimethyl phenol formaldehyde resin was used as a carbon material used for a cathode in the production of the cathode in the non-aqueous electrolyte secondary battery in embodiment 5. In the carbon material, spacing ($d_{002}$) of lattice planes (002) in the carbide of 3, 5-dimethyl phenol formaldehyde resin on its surface was 3.47 Å, and spacing ($d_{002}$) of lattice planes (002) in the natural graphite was 3.35 Å, and the length (Lc) of a crystallite in the direction of the c axis was 7 Å in the carbide of 3, 5-dimethyl phenol formaldehyde resin and was not less than 1000 Å in the natural graphite.

Each of the non-aqueous electrolyte secondary batteries in embodiments 5 to 11 and comparative examples 17 to 23 fabricated in the above-mentioned manner was charged final charge voltage of 4.2 V at a charging current of 100 mA, while being discharged to a final discharge voltage of 2.7 V at a discharge current of 100 mA. 500 cycle tests were carried out with charge and discharge taken as one cycle, to measure a discharge capacity (mAh) after 500 cycles, and find the cycle degradation rate (%) per one cycle. The results are shown in the following Table 8. All initial discharge capacities in the non-aqueous electrolyte secondary batteries in embodiments 5 to 11 and comparative examples 17 to 23 fabricated in the above-mentioned manner were 500 mAh as shown in Table 8.

TABLE 8

| | initial discharge capacity (mAh) | discharge capacity after 500 cycles (mAh) | cycle degradation rate (%) |
|---|---|---|---|
| embodiment 5 | 500 | 450 | 0.02 |
| embodiment 6 | 500 | 450 | 0.02 |
| embodiment 7 | 500 | 425 | 0.03 |
| embodiment 8 | 500 | 475 | 0.01 |
| embodiment 9 | 500 | 450 | 0.02 |
| embodiment 10 | 500 | 450 | 0.02 |
| embodiment 11 | 500 | 425 | 0.03 |
| comparative example 17 | 500 | 125 | 0.15 |
| comparative example 18 | 500 | 75 | 0.17 |
| comparative example 19 | 500 | 50 | 0.18 |
| comparative example 20 | 500 | 25 | 0.19 |
| comparative example 21 | 500 | 125 | 0.15 |
| comparative example 22 | 500 | 275 | 0.09 |
| comparative example 23 | 500 | 250 | 0.10 |

As a result, when the carbon material having a multi-phase graphite structure having two or more different crystallinities in one particle was used as a cathode material as shown in each of the foregoing embodiments 5 to 11, the decrease in the discharge capacity after 500 cycles was small, and the cycle degradation rate was very low. On the other hand, in each of the non-aqueous electrolyte secondary batteries in comparative examples 17 to 23, the discharge capacity after 500 cycles was significantly decreased, and the cycle degradation rate was very high.

Figure 6:
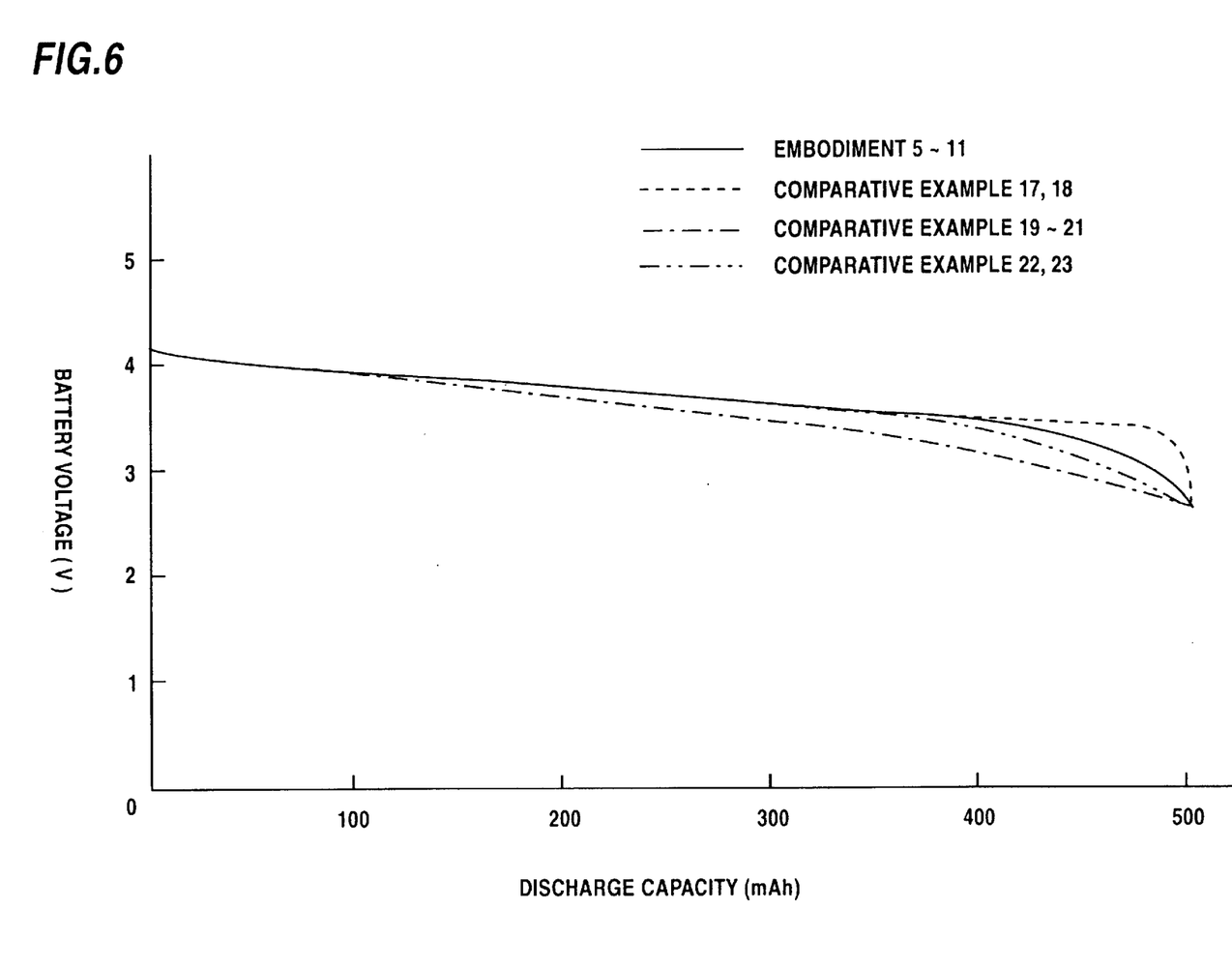
FIG. 6 is a diagram showing the relationship between a discharge capacity and a battery voltage in each of non-aqueous electrolyte secondary batteries in experimental examples 5 to 11 and comparative examples 17 to 23.

With respect to each of the non-aqueous electrolyte secondary batteries in embodiments 5 to 11 and comparative examples 17 to 23, the relationship between a discharge capacity and a battery voltage was found, to examine discharge characteristics in the non-aqueous electrolyte secondary battery. The results are shown in FIG. 6.

As a result, in each of the non-aqueous electrolyte secondary batteries in embodiments 5 to 11, the battery voltage was maintained in a certain flat state to the end of the discharge, and the decrease in the battery voltage at the end of the discharge was gradual.

On the other hand, in each of the non-aqueous electrolyte secondary batteries in comparative examples 17 and 18, the battery voltage was flat and stable to the end of the discharge. However, the battery voltage was rapidly reduced at the end of the discharge. Consequently, it was considered that the carbon material and the non-aqueous electrolytic solution at the cathode reacted with each other, so that the non-aqueous electrolytic solution was decomposed, resulting in degraded cycle characteristics.

Furthermore, in each of the non-aqueous electrolyte secondary batteries in comparative examples 19 to 21, the battery voltage was gradually reduced as the discharge capacity was decreased, so that a stable battery voltage was not obtained. On the other hand, in each of the non-aqueous electrolyte secondary batteries in comparative examples 22 and 23, the same discharge characteristics as those in the non-aqueous electrolyte secondary batteries in embodiments 5 to 11 were exhibited, while the cycle characteristics were much worse than those in embodiments 5 to 11. The reason for this is conceivably that the non-aqueous electrolyte secondary battery in the comparative example 22 does not have a multi-phase graphite structure, unlike the non-aqueous electrolyte secondary batteries in embodiments 5 to 11, because carbon having low crystallinity and carbon having high crystallinity are only mixed with each other, so that a high-potential portion partially occurs at the cathode at the end of the discharge, whereby the non-aqueous electrolytic solution is decomposed upon partially reacting with the cathode. Further, the reason for this is conceivably that the non-aqueous electrolyte secondary battery in comparative example 23 has a structure in which the surface of carbon having high crystallinity is coated with carbon having low crystallinity, and the surface thereof has a multi-phase structure, while the interior thereof has a single-phase structure, whereby the non-aqueous electrolytic solution is decomposed upon partially reacting with the cathode by elimination of the carbon having low crystallinity, for example, at the end of the discharge.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-aqueous electrolyte battery comprising an anode, a cathode including a carbon material, and a non-aqueous electrolytic solution, wherein the carbon material is composed of a core and a surface layer, the core is coated with the surface layer, the core is composed of graphitized carbon in which spacing ($d_{002}$) of lattice planes (002) is in the range of 3.35 to 3.39 Å and the length (Lc) of a crystallite in the direction of the c axis is not less than 1000 Å, and the surface layer is composed of coating graphitized carbon in which spacing ($d_{002}$) of lattice planes (002) is in the range of 3.36 to 3.48 Å and is not less than the spacing ($d_{002}$) of lattice planes (002) in the graphitized carbon to be the core.

2. The non-aqueous electrolyte battery according to claim 1, wherein the amount of the coating graphitized carbon is in the range of 0.1 to 60% by weight per the total amount of the graphitized carbon and the coating graphitized carbon.

3. The non-aqueous electrolyte battery according to claim 1, wherein the amount of the coating graphitized carbon is in the range of 1 to 50% by weight per the total amount of the graphitized carbon and the coating graphitized carbon.

4. The non-aqueous electrolyte battery according to claim 1, wherein the amount of the coating graphitized carbon is in the range of 10 to 30% by weight per the total amount of the graphitized carbon and the coating graphitized carbon.

5. A non-aqueous electrolyte battery comprising an anode, a cathode including a carbon material, and a non-aqueous electrolytic solution, wherein the carbon material is composed of a core and a surface layer, the core is coated with the surface layer, the core is composed of graphitized carbon in which spacing ($d_{002}$) of lattice planes (002) is in the range of 3.35 to 3.39 Å, and the surface layer is composed of a calcined product of an organic substance, said organic substance comprising carbon containing sulfur atoms.

6. The non-aqueous electrolyte battery according to claim 5, wherein the amount of the calcined product of the organic substance is in the range of 0.1 to 50% by weight per the total amount of the graphitized carbon and the calcined product of the organic substance.

7. The non-aqueous electrolyte battery according to claim 5, wherein the amount of the calcined product of the organic substance is in the range of 5 to 40% by weight per the total amount of the graphitized carbon and the calcined product of the organic substance.

8. The non-aqueous electrolyte battery according to claim 5, wherein the amount of the calcined product of the organic substance is in the range of 15 to 25% by weight per the total amount of the graphitized carbon and the calcined product of the organic substance.

9. The non-aqueous electrolyte battery according to claim 5, wherein the ratio of the number of the sulfur atoms to the number of carbon atoms in said calcined product of the organic substance is in the range of 0.01 to 20%.

10. The non-aqueous electrolyte battery according to claim 5, wherein the ratio of the number of the sulfur atoms to the number of carbon atoms in said calcined product of the organic substance is in the range of 1 to 10%.

11. The non-aqueous electrolyte battery according to claim 5, wherein the ratio of the number of the sulfur atoms to the number of carbon atoms in said calcined product of the organic substance is in the range of 5 to 7%.

12. The non-aqueous electrolyte battery according to claim 5, wherein said calcined product of the organic substance composed of carbon containing sulfur atoms is composed of one obtained by calcining and graphitizing a pyrolytic product of an organic substance containing sulfur at temperatures in the range of 2700° to 3000° C.

13. A non-aqueous electrolyte battery comprising an anode, a cathode including a carbon material, and a non-aqueous electrolytic solution, wherein multi-phase graphitized carbon having two or more crystals respectively having different crystallinities in one particle, the length (Lc) of a crystallite in the direction of the c axis in each of the crystals is not less than 10 Å, is said carbon material included in the cathode, said multi-phase graphitized carbon having in one particle at least a crystal in which spacing) ($d_{002}$) of lattice planes (002) is not more than 3.36 Å an a crystal in which spacing ($d_{002}$) of lattice planes (002) is not less than 3.40 Å.

* * * * *